(12) United States Patent
Odom

(10) Patent No.: US 9,804,412 B2
(45) Date of Patent: Oct. 31, 2017

(54) OFF-NOSE EYEWEAR

(71) Applicant: Sherrie J. Odom, Fort Worth, TX (US)

(72) Inventor: Sherrie J. Odom, Fort Worth, TX (US)

( * ) Notice: Subject to any disclaimer, the term of this patent is extended or adjusted under 35 U.S.C. 154(b) by 63 days.

(21) Appl. No.: 14/921,639

(22) Filed: Oct. 23, 2015

(65) Prior Publication Data

US 2017/0115505 A1   Apr. 27, 2017

(51) Int. Cl.
*G02C 5/14* (2006.01)

(52) U.S. Cl.
CPC ..................... *G02C 5/14* (2013.01)

(58) Field of Classification Search
CPC ... G02C 5/00; G02C 5/14; G02C 5/16; G02C 5/18; G02C 5/22; G02C 5/2209; G02C 5/2218; G02C 5/2281; G02C 1/02; G02C 5/04; G02C 5/10; G02C 11/12; G02C 11/00; G02C 11/04; G02C 1/08; A61F 9/026
USPC ......... 351/43, 51, 52, 62, 63, 111, 113, 121, 351/123, 126, 158, 153, 156
See application file for complete search history.

(56) References Cited

U.S. PATENT DOCUMENTS

| 1,978,725 A | 10/1934 | Short | |
|---|---|---|---|
| 6,059,408 A * | 5/2000 | Bonacci | G02C 5/00 351/43 |
| 6,513,925 B1 * | 2/2003 | Bonacci | A61F 9/026 351/43 |
| 7,165,838 B1 | 1/2007 | Sapp | |
| 9,195,076 B2 * | 11/2015 | Kavana | G02C 11/00 |
| 2005/0280771 A1 * | 12/2005 | DiChiara | G02C 1/08 351/111 |

OTHER PUBLICATIONS

Alan R. McBrayer and Thomas F. Valenza, History on Your Face—Common Spectacle Styles Before, During and After the Civil War, 1835-1870, Copyright 2012, Library of Congress, United States of America.

* cited by examiner

*Primary Examiner* — Scott J Sugarman
*Assistant Examiner* — Mustak Choudhury
(74) *Attorney, Agent, or Firm* — Decker, Jones P.C.; Brian K. Yost; Geoffrey A. Mantooth

(57) ABSTRACT

The eyewear comprises a frame, left and right lenses, a bridge member, and left and right arms comprising temporal extensions. A bridge spans between the left and right enclosures such that the two enclosures are joined together at a position, when worn, at the approximate longitudinal center of the wearer's face. The frame is hingedly coupled to the respective arms. At each end of each coupling member, there is a spring/tensioning element that biases each arm inward towards a closed position. Each arm comprises temporal extensions projecting inward from each arm such that when worn, the respective extensions are pressed against the wearer's temple regions of the head. When worn, the arms lightly press the temporal extensions against the wearer's temples and suspend the bridge member above the nose such that little or no pressure is placed upon the wearer's nose or any other part of the face.

13 Claims, 10 Drawing Sheets

OFF-NOSE EYEWEAR

BACKGROUND OF THE INVENTION

1. Field of the Invention

The present invention relates generally to eyewear and specifically to eyewear adapted to reduce or eliminate undesirable pressure and adapted to increase comfort to the wearer.

2. Description of the Prior Art

Eyewear has been around for centuries. The earliest forms of eyewear were eyeglasses. Eyeglasses generally comprise a frame and lenses. Eyeglasses may be balanced on the nose or held in front of the user's face. Eyewear evolved over the years. Bridges, arms (also known as "temples") and various joints were added to eyeglasses. Eyewear comprising temples are known as "spectacles". Although the styles of eyeglasses and spectacles changed over time, with the exception of "lorgnette" style eyeglasses in which the glasses are held in front of the face, one central feature of eyewear is a bridge that, either directly or indirectly, rests on the sides of the wearer's nose. The eyewear, thus, exerts pressure on the wearer's nose and causes discomfort and, in some cases, pain. Moreover, unsightly imprints form where the bridge rests against the nose. Persons with sinus conditions may find it almost unbearable to wear conventional eyewear.

What is needed is eyewear that eliminates pressure on the bridge of the nose and which is comfortable for the wearer. The eyewear of the present invention reduces and eliminates undesirable pressure and may be comfortably worn for extended periods of time.

SUMMARY OF THE INVENTION

A. General Overview

The eyewear of the preferred embodiment generally comprises a frame, left and right lenses, a bridge member, and left and right arms comprising temporal extensions. (In the description that follows, the terms "left" and "right" will refer to the point of view of the wearer while wearing the eyewear). In the preferred embodiment, the frame comprises left and right enclosures that surround a perimeter of the respective left and right lenses. A bridge spans between the left and right enclosures such that the two enclosures are joined together at a position, when worn, at the approximate longitudinal center of the wearer's face.

The frame is hingedly coupled to the respective arms. In the preferred embodiment, the frame comprises coupling members which span between outside portions of the frame and an end of each arm. Although eyewear of the preferred embodiment comprises a frame, the eyewear need not comprise a frame. Rather, the bridge can span between and connect directly to the lenses.

At each end of each coupling member, there is a spring/tensioning element that biases each arm inward towards a closed position. A first spring/tensioning element of each coupling member biases the coupling member inward. As the arm is coupled to the coupling member, the inward biasing action of the first spring/tensioning element on the coupling member also biases the arm to which the coupling member is attached inward. A second spring/tensioning element of each coupling member biases the arm inward. In the preferred embodiment, the second spring/tensioning member comprises a torsion spring and hinge combination known in the art. The first spring/tensioning element comprises a torsion spring without the hinge. Although, the eyewear of the preferred embodiment comprises torsion springs, in other embodiments, the eyewear may comprise other spring/tensioning elements known in the art such as a plunger spring incorporated within the arm and connected directly or indirectly to the frame.

Each arm comprises temporal extensions. In preferred embodiments, each temporal extension projects inward from each arm such that when worn, the respective extensions are pressed against the wearer's temple regions of the head. (Although the word "temple" is often used to describe the arms of conventional eyeglasses, unless otherwise indicated, as used hereafter, the word "temple" will refer to the generally indented area on each side of a person's head.)

When worn, the arms lightly press the temporal extensions against the wearer's temples and suspend the bridge member above the nose such that little or no pressure is placed upon the wearer's nose or any other part of the face. Rather, the lenses are secured in a desired position in front of the wearer's eyes by the arms. This positioning of the eyeglasses eliminates the pain and discomfort caused by the glasses resting on the nose.

The temporal extensions of the present invention may comprise various configurations. Three main embodiments of temporal extensions comprise: 1.) fixed temporal extension embodiments; 2.) removeably coupled temporal extension embodiments; and 3.) adhesively coupled temporal extension embodiments.

1. Fixed Temporal Extension Embodiments

The temporal extensions of one of the preferred embodiments are integrally formed in each arm. In such embodiment, the temporal extension is formed from the same material as the arm. For example, an arm formed from polypropylene through extrusion or injection molding would have the temporal extension formed during the same process and out of the same material. In one of the preferred embodiments, the temporal extension is curvilinear between a forward end and rearward end. In such an embodiment the temporal extension, gradually extends away from the forward end, inward towards an innermost distance from the arm and then outward towards the arm to which the temporal extension is a part of. In this embodiment, a forward portion of the temporal extension is symmetrical with a rearward portion of the extension.

In another embodiment, the temporal extension is curvilinear between an upper temporal extension side and a lower temporal extension side. In such an embodiment the temporal extension, gradually extends away from the upper side, inward towards an innermost distance from the arm and then outward towards the lower temporal extension side. In this embodiment, an upper portion of the temporal extension is symmetrical with a lower portion of the extension.

In another embodiment, the temporal extension comprises an angular configuration such that, when viewed from the top, the forward end of the temporal extension extends further inward than the rearward end of the temporal extension.

In another embodiment, corners of the temporal extension are rounded.

In other embodiments, the temporal extension is slidingly engaged to the arm.

2. Removeably Coupled Temporal Extension Embodiments

In other embodiments, the temporal extension may be removeably coupled to the arm. In this embodiment, the temporal extension comprises, when viewed from the front, an inverted "U" shape with one side of the "U" comprising a curved portion that permits the temporal extension member to be clipped onto the arm.

In one embodiment, the temporal extension comprises padding that may comprise the configurations discussed above concerning the fixed temporal extension embodiments. Thus, the removeably coupled temporal extension may be curvilinear curving inward from front to back or curving inward from top to bottom. The cooperatively coupled temporal extension may be angular.

In some embodiments of the eyewear comprising removeably coupled temporal extension members, the padding may be removeably or adhesively coupled to the temporal extension member.

In some embodiments, the padding comprises one or more strips of padding that may be applied to the temporal extension member by the user in order to properly fit the eyewear.

In some embodiments, the padding is applied to the temporal extension members by cooperative coupling arrangements such as hook and loop fasteners, snaps, and the like.

3. Adhesively Coupled Temporal Extension Embodiments

In some embodiments, the temporal extensions are adhesively applied to the arms. In one embodiment, the adhesively coupled temporal extensions are curvilinear, curving inward from front to back, or curve inward from top to bottom. The adhesively coupled temporal extensions may be angular.

In some embodiments of the eyewear comprising adhesively coupled temporal extensions, the temporal extensions comprises a surface that may be peeled away to expose the adhesive.

In some embodiments, the adhesively coupled temporal extensions comprise one or more strips of padding.

B. Matters General to Many Embodiments

In preferred embodiments, the eyewear frames are formed from plastic or metal. The lenses are formed from polycarbonate or glass. Polycarbonate is preferred because it is lighter. Other suitable materials known well in the art may be used to form the frames and lenses. The padding may be formed from foam, soft material such as cotton, or other suitable materials known in the art which may offer a cushion or flexible surface.

The eyewear may be eyewear worn by a variety of people in a variety of environments. The eyewear may be configured in a number of arrangements and in a number of lens refraction structures known in the art. For example, the eyewear may comprise sunglasses, readers, safety glasses, safety goggles, masks, swim masks, and the like, and may comprise single focal lenses, bifocal lenses, or other lens structures. The temporal extensions may be incorporated within a variety of consumer items such as sunglasses, readers, safety glasses, safety goggles, masks, swim masks, and the like.

DESCRIPTION OF THE PREFERRED EMBODIMENT

Referring to FIGS. 1-10, there is shown the eyewear 12 in accordance with preferred embodiments. As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A. B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present disclosure. Thus, the appearances of such phrases in various places throughout this specification are not necessarily all referring to the same embodiment. Furthermore, the particular features, structures, or characteristics may be combined in any suitable manner on one or more embodiments without limitation. The detailed description illustrates by way of example, not by way of limitation, the principles of the invention. This description will clearly enable one skilled in the art to make and use the invention, and describes several embodiments, adaptations, variations, alternatives, and uses of the invention, including what is presently believed to be the best mode of carrying out the invention. Unless otherwise indicated, reference throughout this document to the word "inward" means a direction moving towards the wearer's temple when the eyeglasses are worn, and the word "rearward" shall refer to a direction moving away from the wearer's temple when the eyeglasses are worn. Unless otherwise indicated, reference throughout this document to the word "forward" shall mean towards the wearers face and the word "rearward" shall mean away from the wearer's face when the eyewear is being worn by the wearer, and the word "forward" shall mean towards the wearer's face when the eyewear is being worn by the wearer and the word "rearward" shall mean away from the wearer's face when the eyewear is being worn by the wearer.

A. General Overview

Figure 1:
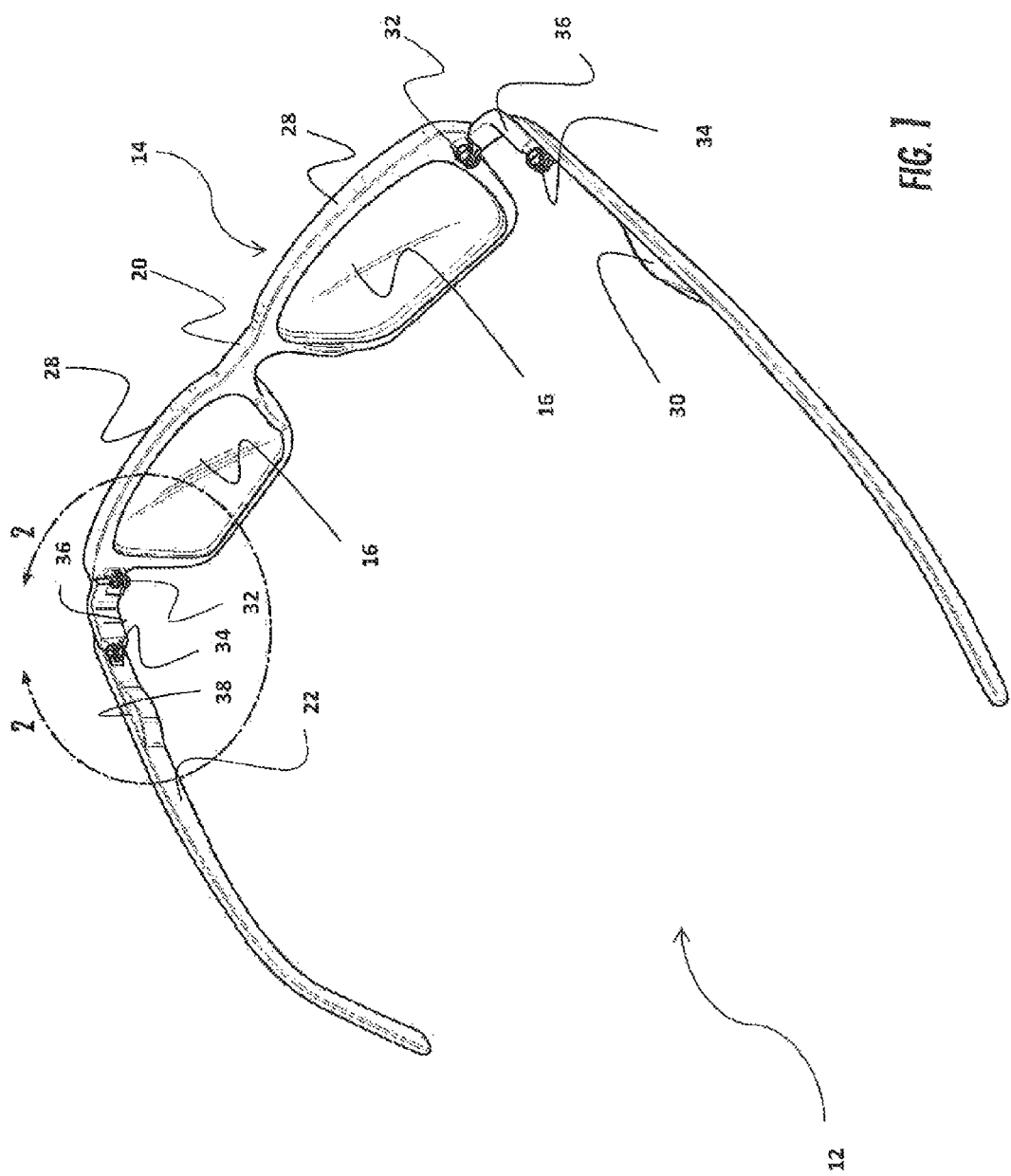
FIG. 1 is a perspective view of the eyewear of the present invention in accordance with a preferred embodiment.

Referring to FIG. 1, the eyewear 12 of the preferred embodiment generally comprises a frame 14, left and right lenses 16, a bridge member 20, and left and right arms 22 comprising temporal extensions 26. (In the description that follows, the terms "left" and "right" will refer to the point of view of the wearer while wearing the eyewear). In the preferred embodiment, the frame 14 comprises left and right enclosures 28 that surround a perimeter of the respective left and right lenses 16. A bridge 20 spans between the left and right enclosures 28 such, when the eyewear 12 is worn, that the two enclosures 28, 28 are joined together at a position at the approximate longitudinal center of the wearer's face.

The frame 14 is hingedly coupled to the respective arms 22. In the preferred embodiment, the frame 14 comprises coupling members 36, 36 which span between outside portions of the frame 14 and an end of each arm 22, 22. Although eyewear 12 of the preferred embodiment comprises a frame 14, the eyewear 12 need not comprise a frame 14. Rather, the bridge 20 can span between and connect directly to the lenses 16, 16.

Figure 2:
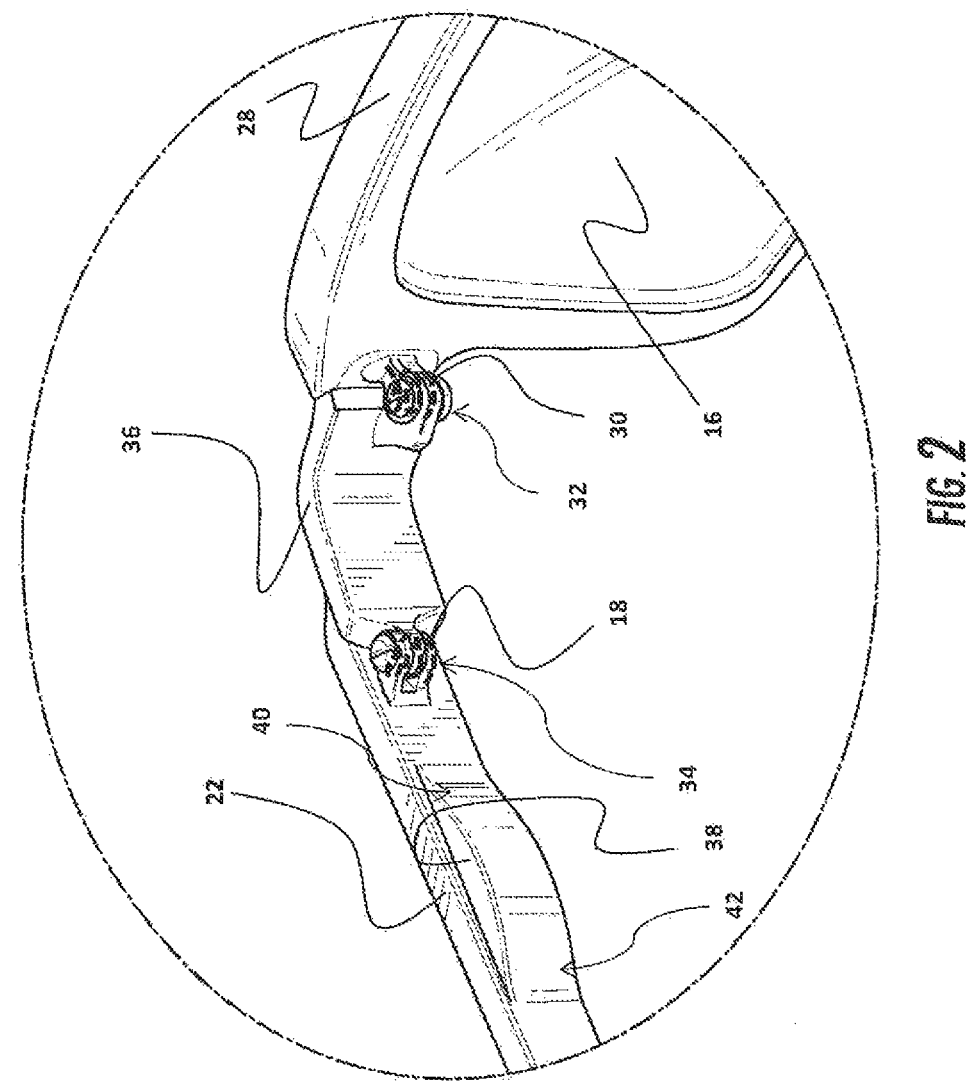
FIG. 2 is an enlarged fragmentary sectional view taken substantially along the line 2-2 of FIG. 1.

Referring to FIGS. 1 and 2, in certain embodiments, at each end of each coupling member 36, there is a spring/tensioning element 32, 34 that biases each arm 22, 24 inward towards a closed position. A first spring/tensioning element 32 of each coupling member 36 biases the coupling member 36 inward. Because the arm 22 is coupled to the coupling member 36, the inward biasing action of the first spring/tensioning element 32 on the coupling member also biases the arm 22 to which the coupling member 36 is attached inward. A second spring/tensioning element 34 of each coupling member 36 also biases the arm 22 inward. In the preferred embodiment, the first and second spring/tensioning member 32, 34 comprise a torsion spring 18 and hinge 30 combination known in the art. Although, the eyewear 12 of the preferred embodiment comprises torsion springs 18, in other embodiments, the eyewear 12 may comprise other spring/tensioning elements known in the art such as a plunger spring incorporated within the arm and connected directly or indirectly to the frame 14.

Figure 3:
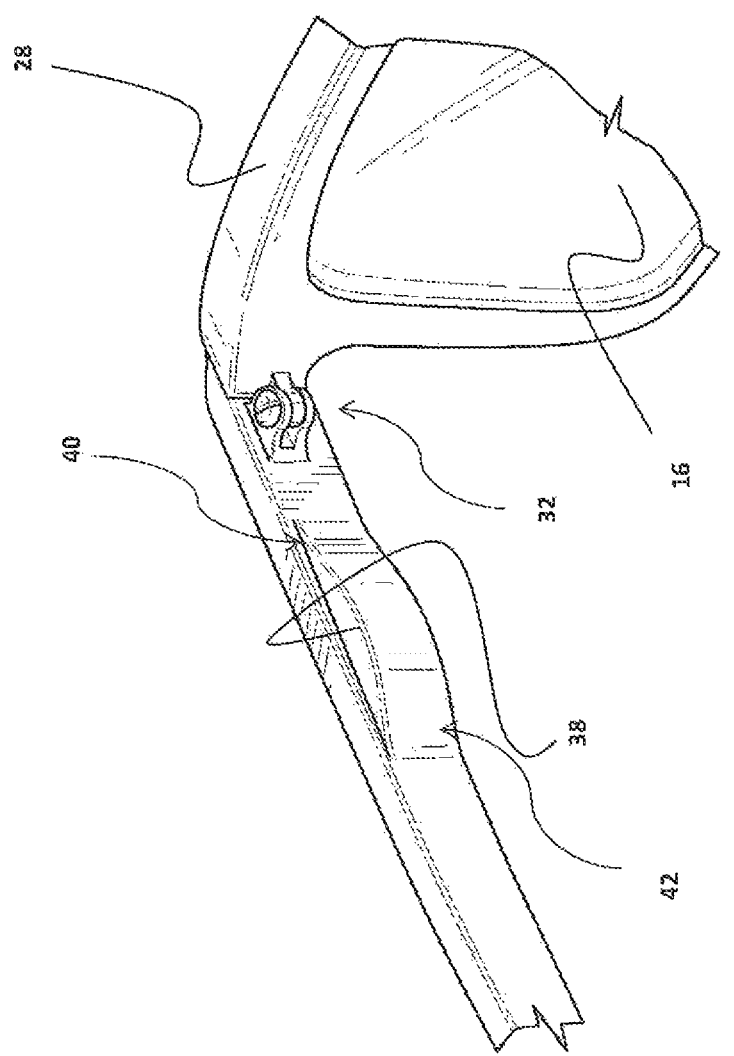
FIG. 3 is an enlarged fragmentary sectional perspective view of the eyewear of the present invention in accordance with another embodiment.
Figure 4:
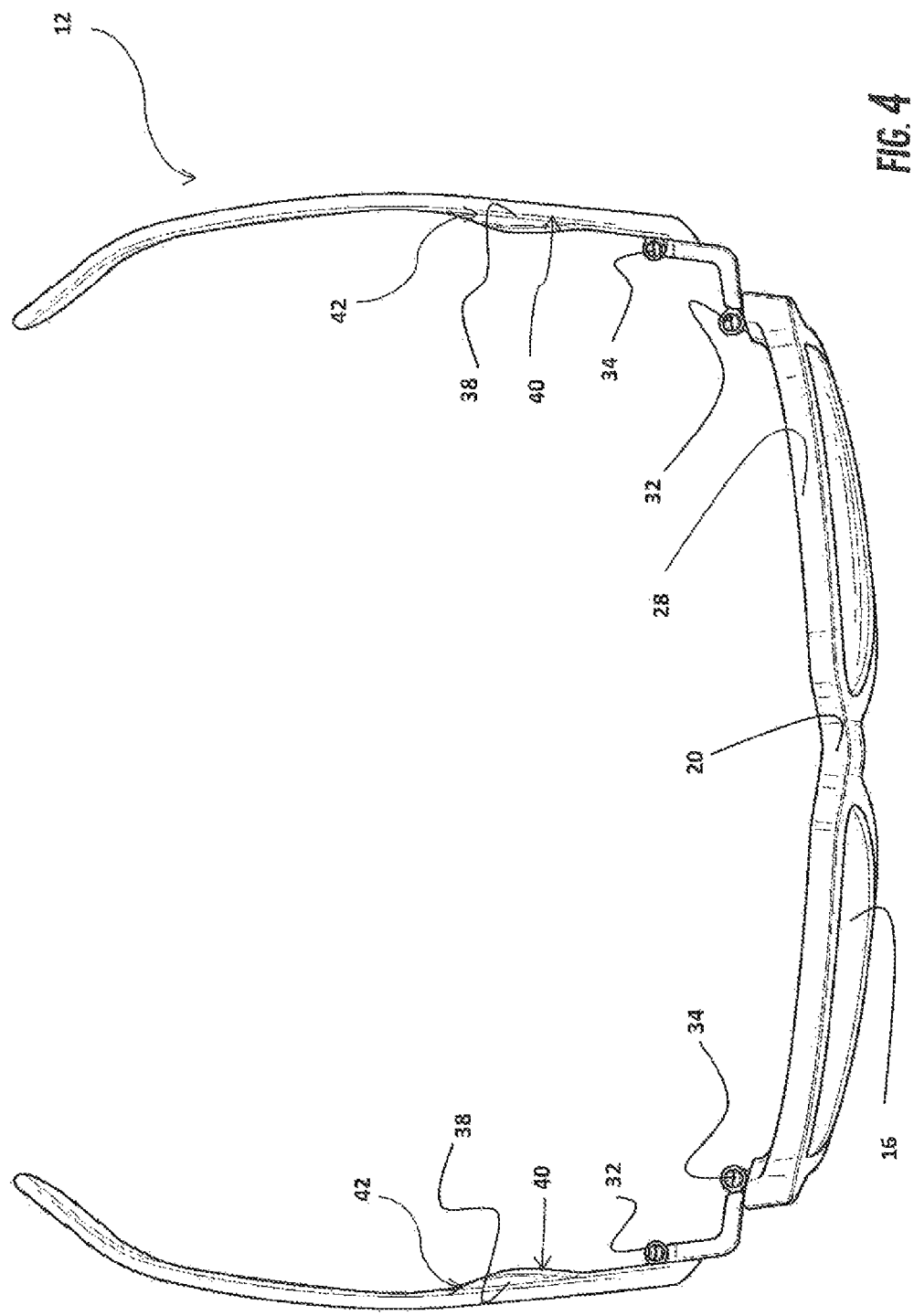
FIG. 4 is a top side elevation view, of the eyewear of FIG. 1.

Referring to FIG. 3, in some embodiments, the eyewear 12 comprises only a single hinge 30 joining the arm 22 to the frame 14. This hinge 30 may comprise a spring/tensioning element 32, 34. In other embodiments, the eyewear 12 does not comprise spring/tensioning elements 32, 34. Rather, in such embodiments, the natural elastic nature of the frame 14 and arms 22 maintain slight inward pressure such that the arms 22 are positioned against the sides of the users head. For example, in some embodiments, the frame 14 and arm arrangement 22 are such that a distance between the arms 22 is slightly less that a width of the wearer's head. Thus, the arms 22 fit snugly against the wearer's head.

Each arm 22 comprises a temporal extension 38. Each temporal extension 38 projects inward from each arm 22 such that when worn, the respective temporal extensions, 38, 38 are pressed against the wearer's temple regions of the head. (Although the word "temple" is often used to describe the arms of conventional eyeglasses, unless otherwise indicated, as used hereafter, the word "temple" will refer to the generally indented area on each side of a person's head.)

When the eyewear 12 is worn, the arms 22 lightly press the temporal extensions 38 against the temple regions of the wearer's head and suspend the bridge member 20 above the nose such that little or no pressure is placed upon the wearer's nose or any other part of the face. Rather, the lenses 16, 16 are secured in a desired position in front of the wearer's eyes by the arms 22, 22. This positioning of the eyewear 12 eliminates the pain and discomfort caused by the eyewear 12 resting on the nose.

Figure 5:
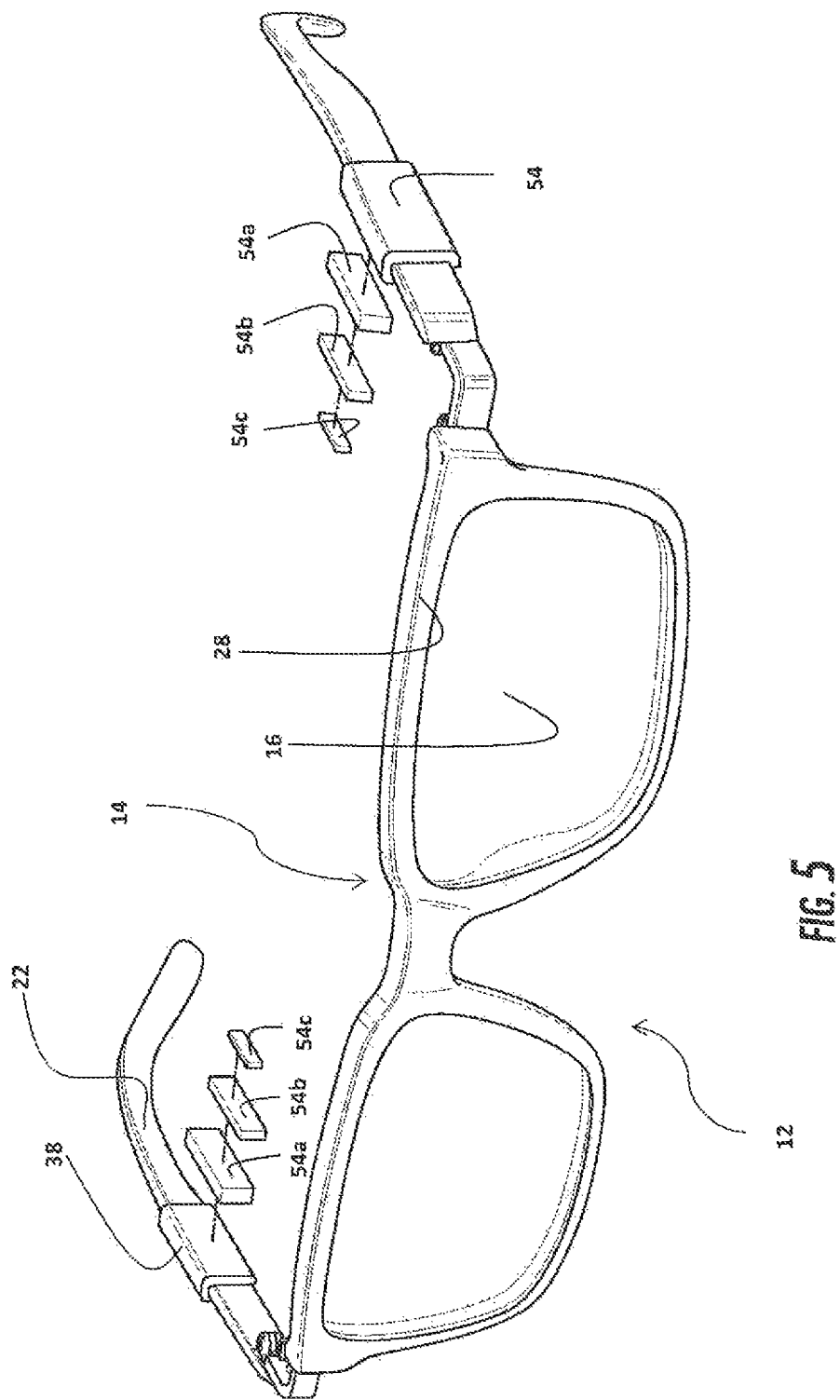
FIG. 5 is a perspective view of the eyewear of the present invention in accordance with another embodiment.

The temporal extensions 38, 38 of the present invention may comprise various configurations. Three main embodiments of temporal extensions 38, 38 comprise: 1.) fixed temporal extension 38 embodiments (FIGS. 1-4); 2.) Removeably coupled temporal extension 38 embodiments (FIG. 5); and 3.) Adhesively coupled temporal extension 38 embodiments (FIGS. 5 and 9).

1. Fixed Temporal Extension Embodiments

Referring to FIGS. 1-4, the temporal extensions 38, 38, of some of the preferred embodiments are integrally formed in each arm 22. In such embodiments, the temporal extension 38 is formed from the same material as the arm 22. For example, an arm 22 formed from extrusion or injection molding would have the temporal extension 38 formed during the same process and out of the same material. Referring to FIGS. 1-4 (and as best shown in FIG. 2) in some of the preferred embodiments, the temporal extension 38 is curvilinear between a forward portion 40 and rearward portion 42. In such an embodiment the temporal extension 38, gradually extends away from the forward end 40, inward towards an innermost distance from the arm 22 and then outward towards the arm 22 to which the temporal extension 38 is a part of. In this embodiment, the forward portion 40 of the temporal extension 38 is symmetrical with the rearward portion 42 of the temporal extension 38.

Figure 7:
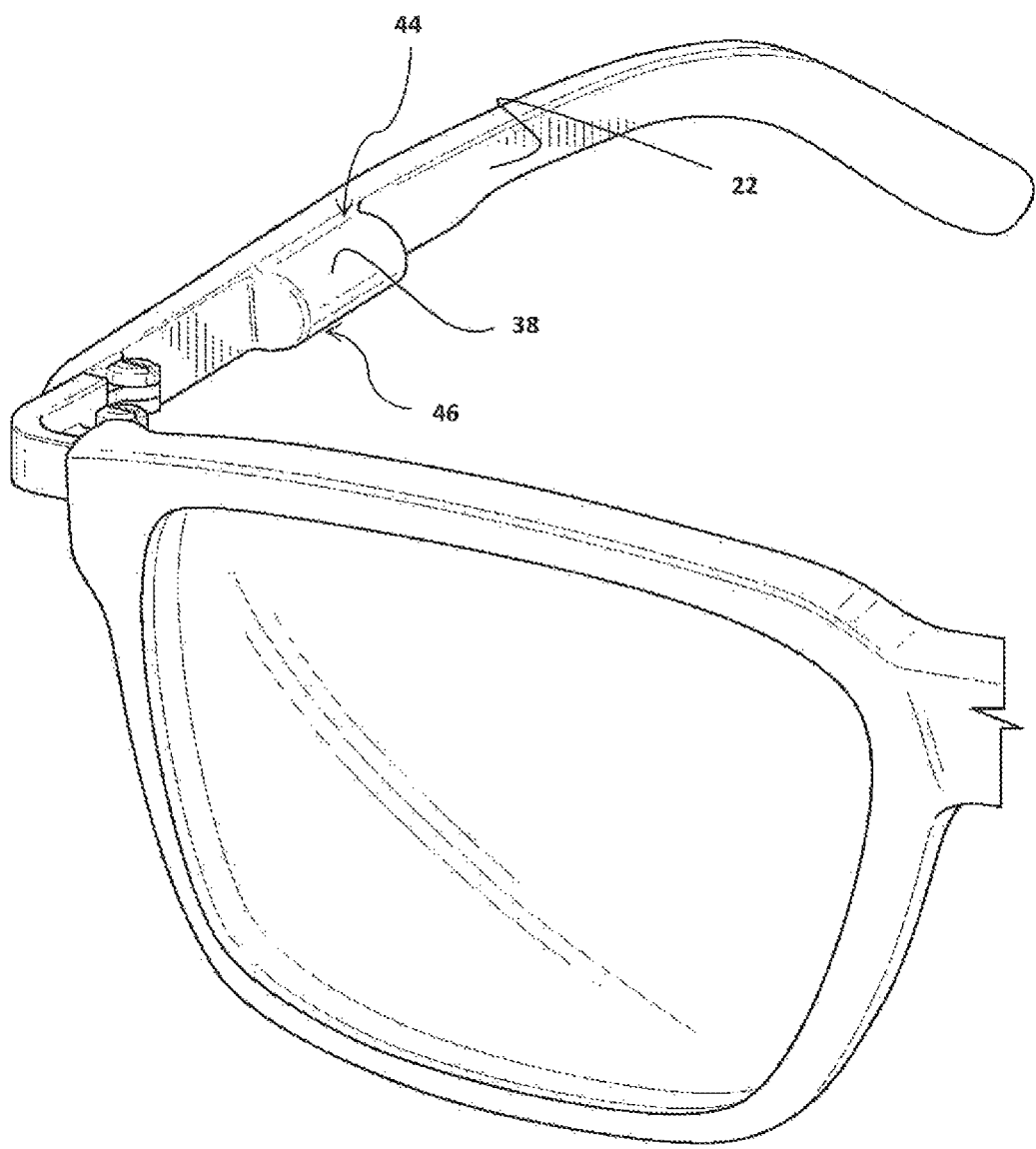
FIG. 7 is an enlarged fragmentary sectional perspective view of the eyewear of the present invention in accordance with another embodiment.
Figure 8:
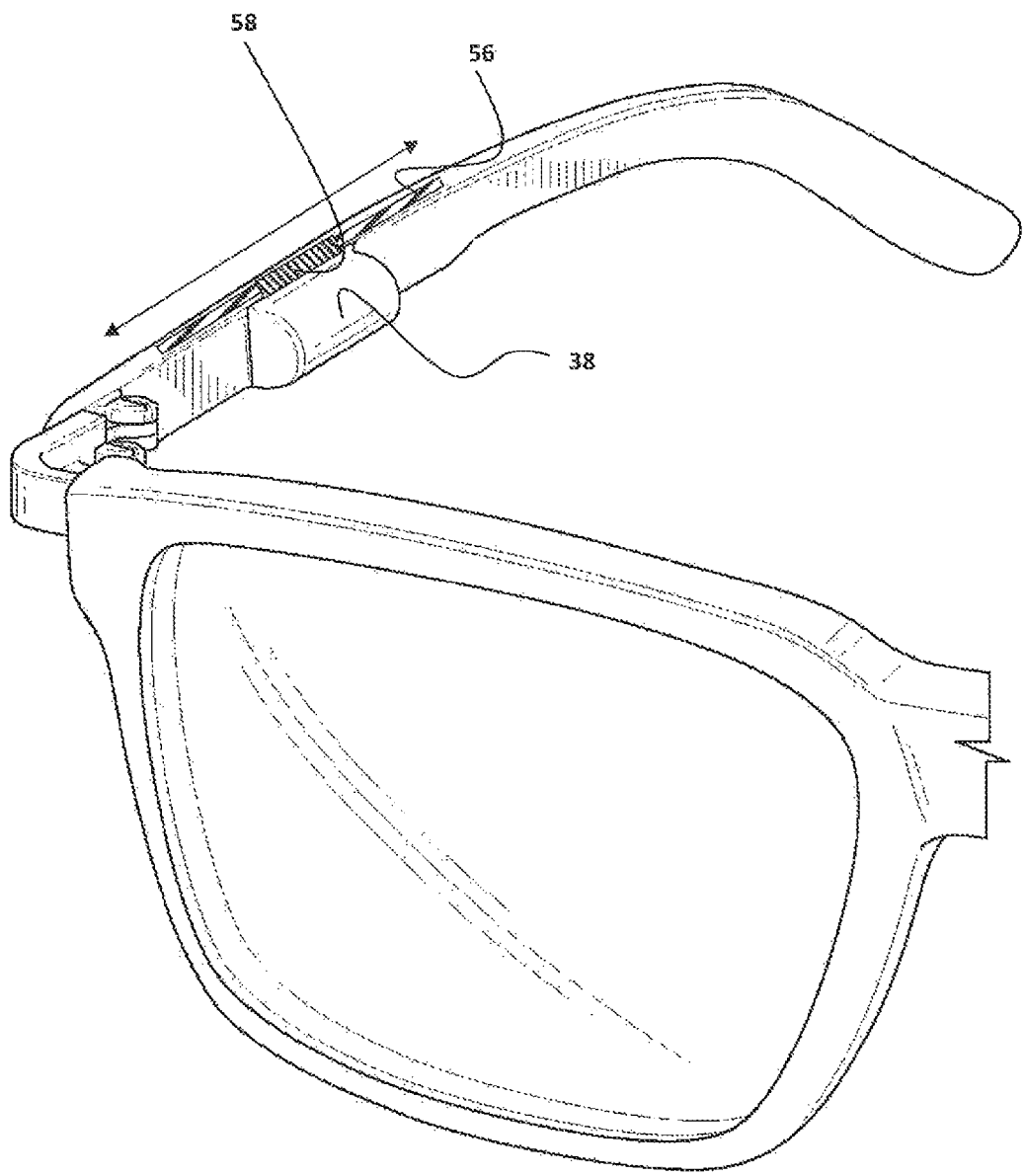
FIG. 8 is an enlarged fragmentary sectional perspective view of the eyewear of the present invention in accordance with another embodiment.

Referring to FIG. 7, in another embodiment, the temporal extension 38 is curvilinear between an upper temporal extension side 44 and a lower temporal extension side 46. In such an embodiment the upper and lower temporal extension sides 44, 46 gradually curve away from the arm towards an innermost distance from the arm 22 where the upper temporal extension side 44 and lower temporal extension side 46 meet. In this embodiment, the upper temporal extension side 44 and lower temporal extension side 46 are symmetrical with one another.

Figures 9A, 9B:
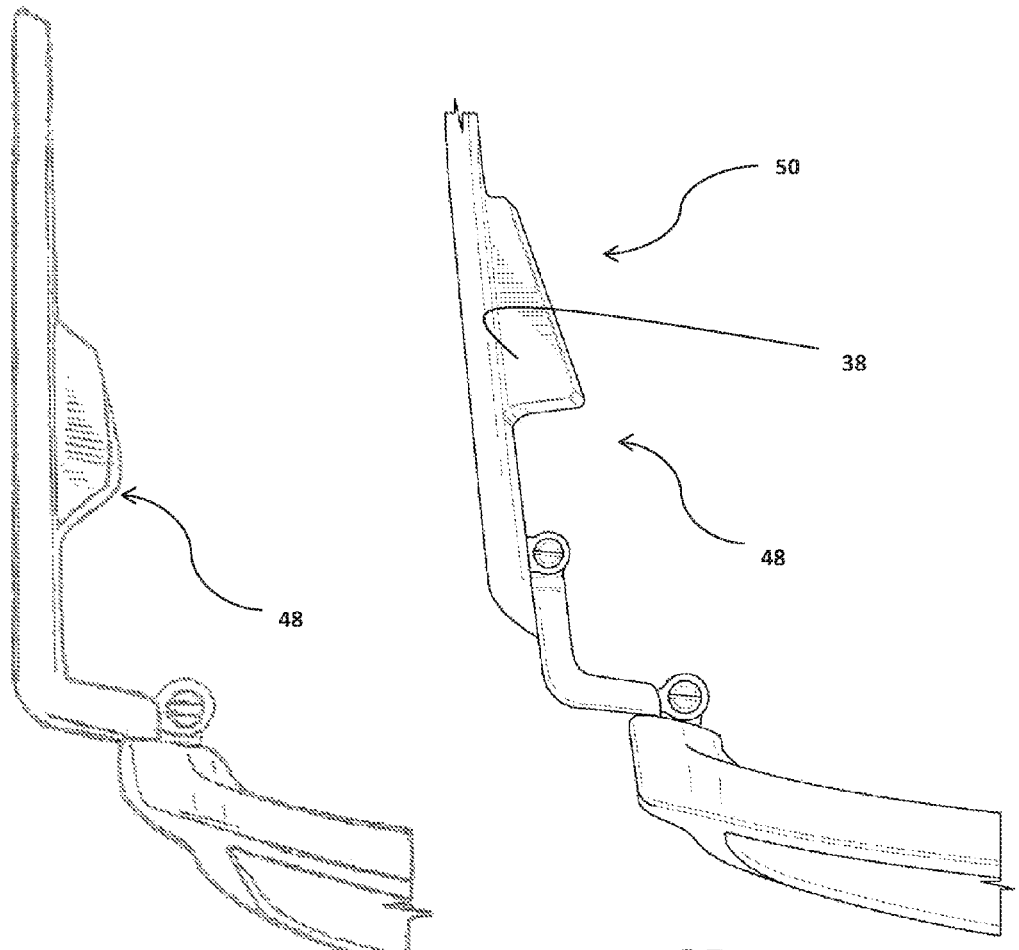
FIG. 9A is an enlarged fragmentary sectional perspective view of the eyewear of the present invention in accordance with another embodiment.
FIG. 9B is an enlarged fragmentary sectional perspective view of the eyewear of the present invention in accordance with another embodiment.

Referring to FIGS. 9A and 9B, in other embodiments, the temporal extension 38 comprises an angular configuration such that, when viewed from the top, a forward end 48 of the temporal extension 38 extends further inward than a rearward end 50 of the temporal extension 38. In the embodiment shown in FIG. 9A, the arms 22 do not comprise ear loops (portions that hook or angle around the ears of the wearer.

Figure 6:
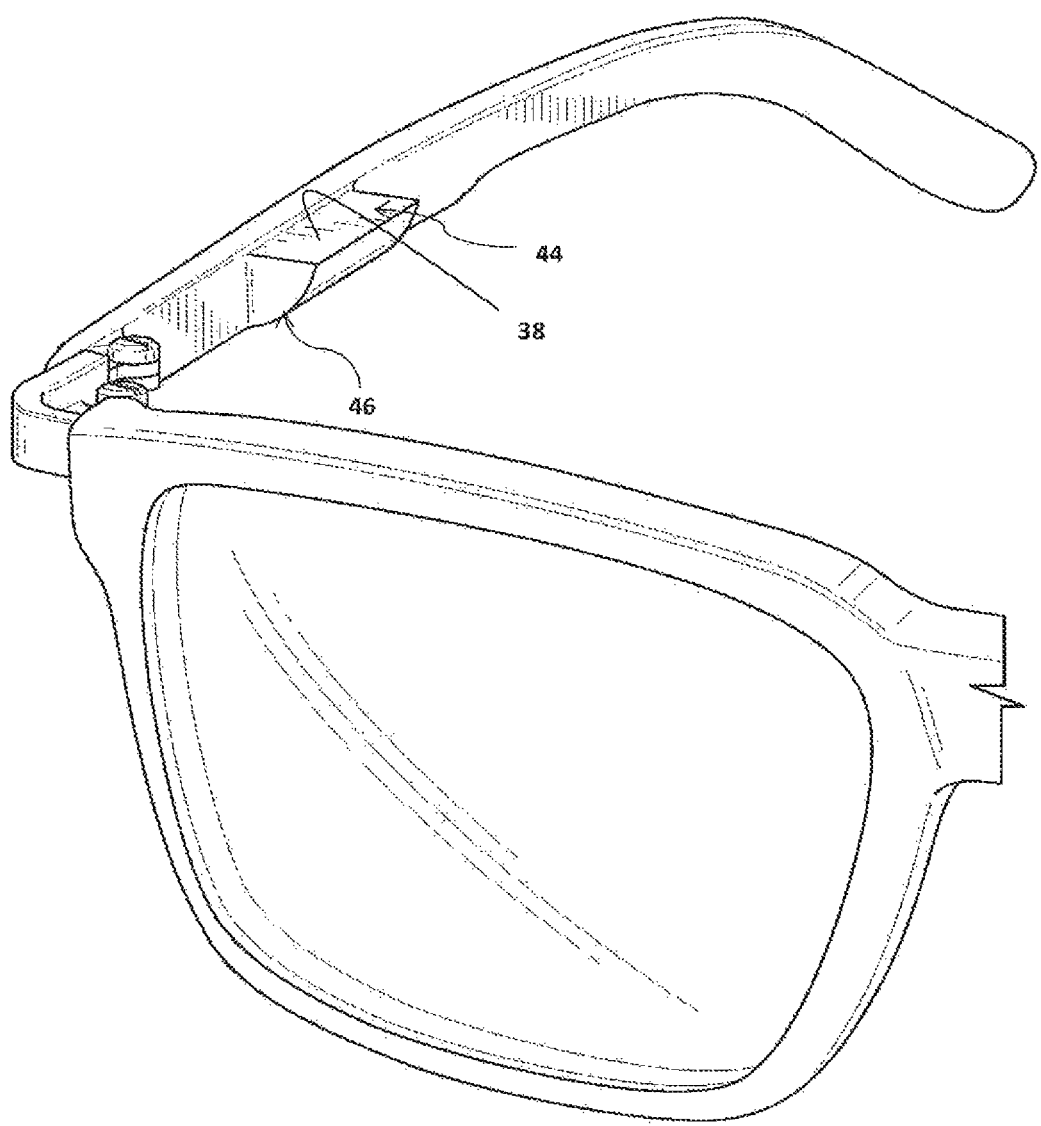
FIG. 6 is an enlarged fragmentary sectional perspective view of the eyewear of the present invention in accordance with another embodiment.

Referring to FIG. 6, in other embodiments, one or more corners or sides may of the extension member 38 may be rounded. For example, as shown in FIG. 6, the lower temporal extension side 46 may be rounded and the upper temporal extension side 44 flat.

2. Removeably Coupled Temporal Extension Embodiments

Figures 5A, 5B:
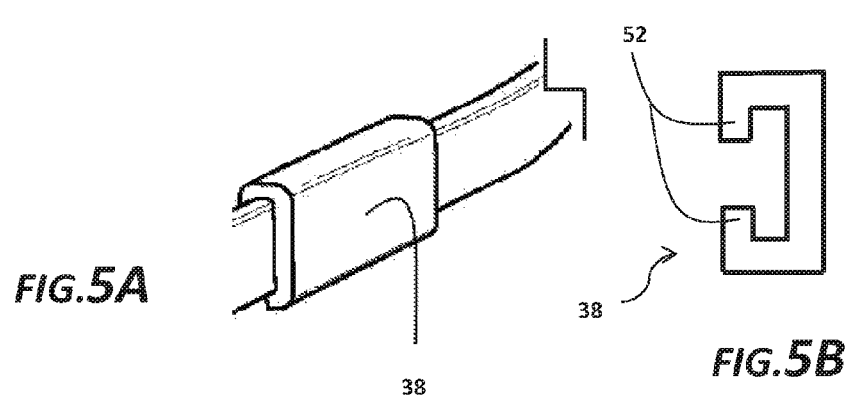
FIG. 5A is a close-up view of the temporal extension member of FIG. 5.
FIG. 5B is an end view of the temporal extension member of FIG. 5A.

Referring to FIGS. 5, 5A, and 5B, in other embodiments, the temporal extension 38 may be removeably coupled to the arm 22. In this embodiment, the temporal extension 38 comprises, when viewed from the front, a "C" shape (or reverse "C", depending on which arm the temporal extension is positioned) with the open side of the "C" comprising a clasp portions 52 that permits the temporal extension 38 member to be clipped onto the arm 22.

In one embodiment, the temporal extension comprises padding 54 that may comprise the configurations discussed above concerning the fixed temporal extension 38 embodiments. Thus, the removeably coupled temporal extension 38 may be curvilinear between the forward portion 40 and rearward portion 42. In such an embodiment the temporal extension 38, gradually extends away from the forward end 40, inward towards an innermost distance from the arm 22 and then outward towards the arm 22 to which the temporal extension 38 is a part of. In this embodiment, the forward portion 40 of the temporal extension 38 is symmetrical with the rearward portion 42 of the temporal extension 38.

In another embodiment of the removeably coupled temporal extension 38, the removeably coupled temporal extension 38 is curvilinear between an upper temporal extension side 44 and a lower temporal extension side 46. In such an embodiment the upper and lower temporal extension sides 44, 46 gradually curve away from the arm towards the innermost distance from the arm 22 where the upper temporal extension side 44 and lower temporal extension side 46 meet. In this embodiment of the removeably coupled temporal extension 38, the upper temporal extension side 44 and lower temporal extension side 46 are symmetrical with one another.

In another embodiment of the removeably coupled temporal extension 38, the removeably coupled temporal extension 38 comprises an angular configuration such that, when viewed from the top, the forward end 48 of the temporal extension 38 extends further inward than the rearward end 50 of the temporal extension 38.

In another embodiment of the removeably coupled temporal extension 38, one or more corners or sides of the extension member 38 may be rounded. For example, the removeably coupled temporal extension 38 side 46 may be rounded and the upper temporal extension side 44 flat.

In some embodiments of the eyewear 12 comprising removeably coupled temporal extension members 38, the padding 54a-54c may be removeably or adhesively coupled to the temporal extension member 38.

In some embodiments, the padding 54a-54c comprises one or more strips of padding 54a-54c that may be applied to the temporal extension member 38 by the user in order to properly fit the eyewear 12.

In some embodiments, the padding 54a-54c is applied to the temporal extension members 38 by cooperative coupling arrangements such as hook and loop fasteners, snaps, and the like.

In other embodiments, the temporal extension 38 may be selectively positioned by the wearer. For example, Referring to FIG. 8, the temporal extension may be slidingly engaged to the arm 22. In one embodiment, the arm comprises a groove 56 into which a cooperatively fitting temporal extension sliding member 58 fits. The temporal extension sliding member 58 is coupled to longitudinal side of the temporal member 38 and slidingly arranged within the groove 56 such that the temporal extension 38 may be moved to a desired position by the wearer. This arrangement permits, for example, a single pair of eyewear to be comfortably worn by wearers of different sizes. In some embodiments, the groove and temporal sliding member arrangement 56, 58 comprises incremental detent positions such that the temporal extension 38 may be moved incrementally along the groove 56 to a desired detent position. In other embodiments, the groove and temporal sliding member arrangement 56, 58 is frictionally arranged such that the temporal extension 38 may be moved to any position between beginning and ending groove positions and remain in the desired position until a sufficient amount of force or pressure is exerted on the temporal extension sliding member 58 to cause it to move within the groove 56. In some embodiments, a graduated scale is provided proximate to the groove 56 which permits the wearer to accurately move the temporal extension 38 to predetermined desired positions. In some embodiments, the temporal extension sliding member 58 comprises a spring element that biases the temporal extension sliding member 58 inward. In such embodiments, the temporal extension sliding member 58 may be pressed outward to permit the temporal extension sliding member 58 to slide within the groove 56 to a desired position. When released, the temporal extension sliding member 58 of such embodiment will move inward and engage a portion of the groove 56 such that the temporal extension sliding member 58 remains in the desired position.

In some embodiments, the temporal extension sliding member 58 comprises a spring element that biases the temporal extension sliding member 58 outward. In such embodiments, the temporal extension sliding member 58 may be pulled or otherwise positioned inward to permit the temporal extension sliding member 58 to slide within the groove 56 to a desired position. When released, the temporal extension sliding member 58 of such embodiment will move outward and engage a portion of the groove 56 such that the temporal extension sliding member 58 remains in the desired position.

The eyewear 12 may comprise other sliding arrangements that permit the temporal extension 38 to be slidingly moved to a desired position. For example, referring to FIG. 5, in some embodiments the temporal extension 38 that is removeably coupled to the arm 22 may be slidingly arranged such that the temporal extension may be slid along a length of the arm 22 to a desired position. In some embodiments comprising a removeably coupled temporal extension 38, the arm 22 may comprises incremental detent positions such that the temporal extension 38 may be moved incrementally along the arm 22 to a desired detent position. Such detents may comprise a ridge, protrusion, or depression structured and arranged to engage a cooperative element on the temporal extension 38. In other embodiments comprising a removeably coupled temporal extension 38, the arm 22 and removeably coupled temporal extension 38 are frictionally arranged such that the temporal extension 38 may be moved to any position between beginning and ending arm 22 positions and remains in the desired position until a sufficient amount of force or pressure is exerted on the temporal extension 38 to cause it to move along the arm 22. In some embodiments, a graduated scale is provided at positions along the arm 22 which permits the wearer to accurately move the temporal extension 38 to predetermined desired positions in relation to the arm 22.

3. Adhesively Coupled Temporal Extension Embodiments

Figure 10:
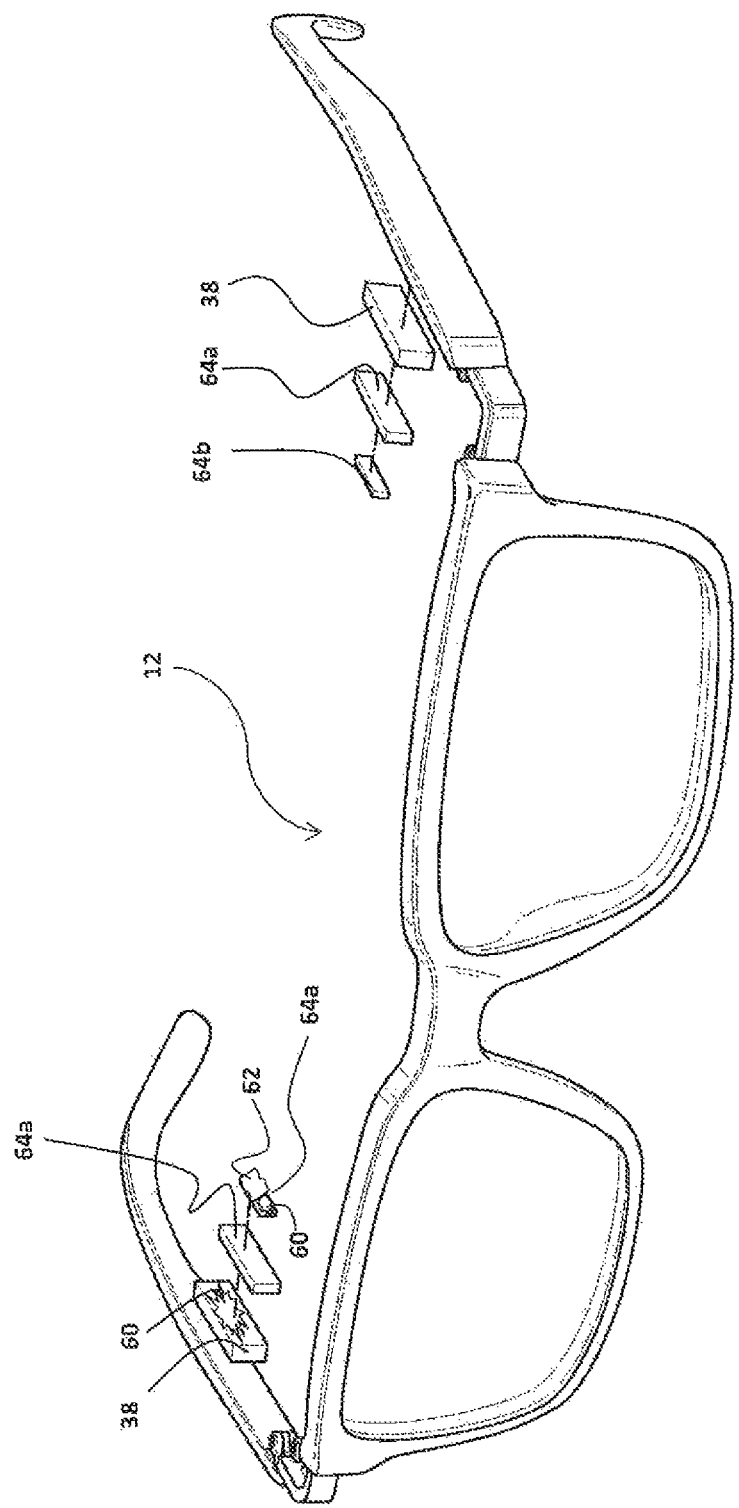
FIG. 10 is a perspective view of the eyewear of the present invention in accordance with another embodiment.

In some embodiments, the temporal extensions 38 are adhesively applied to the arms 22. Referring to FIG. 10, there is shown eyewear 12 comprising adhesively applied temporal extensions 38. The adhesive applied temporal extension 38 may be a single temporal extension 38 or, as shown in FIG. 10 may comprise one or more separately applied adhesive members 64a, 64b. In some embodiments of the eyewear 12 comprising adhesively coupled temporal extensions 38, the temporal extension 38 or separately applied adhesive members 64a, 64b comprise a surface 62 that may be peeled away to expose adhesive 60.

Thus, the temporal extension 38 may be arranged in a number of different configurations. The adhesively coupled temporal extensions 38 may comprise the configurations discussed above concerning the fixed temporal extension 38 embodiments and the removeably coupled temporal extension 38 embodiments. The adhesively coupled temporal extensions 38, 64a, 64b may be curvilinear between the forward portion 40 and rearward portion 42. In such an embodiment the temporal extension 38, gradually extends away from the forward end 40, inward towards an innermost distance from the arm 22 and then outward towards the arm 22 to which the temporal extension 38 is a part of. In this embodiment, the forward portion 40 of the temporal extension 38 is symmetrical with the rearward portion 42 of the temporal extension 38.

In another embodiment of the adhesively coupled temporal extensions 38, 64a, 64b, the adhesively coupled temporal extensions 38, 64a, 64b are curvilinear between an upper temporal extension side 44 and a lower temporal extension side 46. In such an embodiment the upper and lower temporal extension sides 44, 46 gradually curve away from the arm towards the innermost distance from the arm 22 where the upper temporal extension side 44 and lower temporal extension side 46 meet. In this embodiment of the adhesively coupled temporal extensions 38, 64a, 64b, the upper temporal extension side 44 and lower temporal extension side 46 are symmetrical with one another.

In another embodiment of the adhesively coupled temporal extensions 38, 64a, 64b, the adhesively coupled temporal extensions 38, 64a, 64b comprise an angular configuration such that, when viewed from the top, the forward end 48 of the temporal extension 38 or separately applied adhesive extensions 64a, 64b extends further inward than the rearward end 50 of the temporal extension 38.

In another embodiment of the adhesively coupled temporal extensions 38, 64a, 64b, one or more corners or sides of the adhesive extension members 38, 64a, 64b may be rounded. For example, the adhesive extension member's 38, 64a, 64b side 46 may be rounded and the upper temporal extension side 44 flat.

In some embodiments of the eyewear 12 comprising adhesive extension members 38, 64a, 64b, comprises padding such that, for example, the eyewear 12 is comfortable to wear.

B. Matters General to Many Embodiments

In preferred embodiments, the eyewear frames 28 are formed from plastic or metal. The lenses 16 are formed from polycarbonate or glass. Polycarbonate is preferred because it is lighter. Other suitable materials known well in the art may be used to form the frames 28 and lenses 16. The padding may be formed from foam, soft material such as cotton, or other suitable materials known in the art which may offer a cushion or flexible surface.

The eyewear 12 may be eyewear 12 worn by a variety of people in a variety of environments. The eyewear 12 may be configured in a number of arrangements and in a number of lens 16 refraction structures known in the art. For example, the eyewear 12 may comprise sunglasses, readers, safety glasses, safety goggles, masks, swim masks, and the like, and may comprise single focal lenses, bifocal lenses, or other lens 16 structures. The temporal extensions 38 may be incorporated within a variety of consumer items such as sunglasses, readers, safety glasses, safety goggles, masks, swim masks, and the like.

The eyewear 12 and various components can be adorned with different designs and ornamentation. For example, the temporal extensions 38 can have logos, designs, pictures, words, phrases, or other ornamentation. By way of additional example, but not limitation, the padding 54a-54c may comprise a brand name such as EZ EYES. Or, the padding 54a-54c may comprise a gemstone, two dimensional image, three dimensional image or other ornamentation on, for example, the padding 54 on the outside of the arm 22.

While there has been illustrated and described what is, at present, considered to be a preferred embodiment of the present invention, it will be understood by those skilled in the art that various changes and modifications may be made, and equivalents may be substituted for elements thereof without departing from the true scope of the invention. Therefore, it is intended that this invention not be limited to the particular embodiment disclosed as the best mode contemplated for carrying out the invention, but that the invention will include all embodiments falling within the scope of this disclosure.

I claim:

1. Eyewear comprising:
   first and second arms and a frame, the frame comprising a bridge;
   the arms being attached to the frame,
   each of said arms comprising an inward side surface and an outward side surface, the inward side surface being closer to a wearer's head than the outward side surface when the eyewear is worn;
   each arm comprising front, temporal, and rear portions;
   the first arm temporal portion comprising a first arm temporal extension, the first arm temporal extension extending further from the first arm inward side surface than the first arm rear portion extends from the first arm inward side surface such that, when the eyewear is worn by the wearer, the first arm temporal extension portion presses inwardly against a region of a first side of the wearer's head;
   the second arm temporal portion comprising a second arm temporal extension, the second arm temporal extension extending further from the second arm inward side surface than the second arm rear portion extends from the second arm inward side surface such that, when the eyewear is worn by the wearer, the second arm temporal extension portion presses inwardly against a region of a second side of the wearer's head; and
   the eyewear being structured and arranged such that, when the eyewear is worn by the wearer, the bridge member above the nose such that little or no pressure is placed upon the wearer's nose.

2. The eyewear of claim 1, the arms being biased inwardly towards one another.

3. The eyewear of claim 2, the first arm being hingedly attached to a first side of the frame, the second arm being hingedly attached to a second side of the frame.

4. The eyewear of claim 1, the region of the first side of the wearer's head being a first side temple region, the region of the second side of the wearer's head being a second side temple region.

5. The eyewear of claim 1, the respective temporal extensions being integrally formed within each respective arm.

6. The eyewear of claim 1, the respective temporal extensions being removably coupled to each respective arm.

7. The eyewear of claim 1, the respective temporal extensions being adhesively coupled to each respective arm.

8. The eyewear of claim 1, the respective temporal extensions being slideably coupled to each respective arm.

9. Eyewear comprising:
first and second arms and a frame, the frame comprising a bridge;
the arms being attached to the frame, each of said arms comprising an inward side surface and an outward side surface, the inward side surface being closer to a wearer's head than the outward side surface when the eyewear is worn;
the arms each being inwardly biased towards one another; the first arm being hingedly attached to a first side of the frame, the second arm being hingedly attached to a second side of the frame; and
each arm comprising front, temporal, and rear portions;
the first arm temporal portion comprising a first arm temporal extension, the first arm temporal extension extending further from the first arm inward side surface than the first arm rear portion extends from the first arm inward side surface such that, when the eyewear is worn by the wearer, the first arm temporal extension portion presses inwardly against a region of a first side of the wearer's head;
the second arm temporal portion comprising a second arm temporal extension, the second arm temporal extension extending further from the second arm inward side surface than the second arm rear portion extends from the second arm inward side surface such that, when the eyewear is worn by the wearer, the second arm temporal extension portion presses inwardly against a region of a second side of the wearer's head; and
such that, when the eyewear is worn by the wearer, the bridge member above the nose such that little or no pressure is placed upon the wearer's nose.

10. The eyewear of claim 9, the respective temporal extensions being removably coupled to each respective arm.

11. The eyewear of claim 10, the temporal extensions each comprising an upper temporal extension side and a lower temporal extension side; the temporal extensions each being curvilinear between said respective upper and lower temporal extension sides.

12. The eyewear of claim 9, the respective temporal extensions being adhesively coupled to each respective arm.

13. The eyewear of claim 9, the respective temporal extensions being slideably coupled to each respective arm.

* * * * *